(12) United States Patent
Murtagh et al.

(10) Patent No.: US 8,005,493 B2
(45) Date of Patent: Aug. 23, 2011

(54) MESSAGING SYSTEM AND METHOD

(75) Inventors: John Murtagh, Dublin (IE); Triona Mullane, Dublin (IE); Padraig Murtagh, Dublin (IE); Robert Gahan, Dublin (IE)

(73) Assignee: Anam Mobile Limited, Dublin (IE)

( * ) Notice: Subject to any disclaimer, the term of this patent is extended or adjusted under 35 U.S.C. 154(b) by 80 days.

(21) Appl. No.: 10/574,190

(22) PCT Filed: Oct. 12, 2005

(86) PCT No.: PCT/IE2005/000114
§ 371 (c)(1),
(2), (4) Date: Feb. 7, 2007

(87) PCT Pub. No.: WO2006/040749
PCT Pub. Date: Apr. 20, 2006

(65) Prior Publication Data
US 2008/0045246 A1    Feb. 21, 2008

(30) Foreign Application Priority Data
Oct. 14, 2004    (IE) .................................. S2004/0693

(51) Int. Cl.
*H04W 4/00* (2009.01)
*H04W 40/00* (2009.01)
(52) U.S. Cl. ................... 455/466; 455/445; 455/433
(58) Field of Classification Search ............. 455/466, 455/445, 422, 432, 458, 31.1, 31.2; 370/328, 370/310, 349, 393; 707/104.1, 769; 379/88.13
See application file for complete search history.

(56) References Cited

U.S. PATENT DOCUMENTS
5,856,972 A    1/1999    Riley et al.
(Continued)

FOREIGN PATENT DOCUMENTS
| EP | 1189473 A2 | 3/2002 |
| EP | 1255414 A2 | 6/2002 |
| EP | 1408705 A1 | 4/2004 |
| IE | 2000/0671 | 8/2001 |

(Continued)

OTHER PUBLICATIONS

James Aitken, "Signalling Relay Intelligence, Alternatives to the Intelligent Network Architecture in Mobile Networks," Logica Aldiscon, 1999, pp. 1-11.

*Primary Examiner* — Lester Kincaid
*Assistant Examiner* — Kuo Woo
(74) *Attorney, Agent, or Firm* — The Webb Law Firm (57) ABSTRACT

The invention relates to a system and method of managing SMS messages in a first mobile operator network, said network comprising a plurality of subscribers and a Short Message Service Centre (SMSC) The invention can be implemented by carrying out the steps of starting a delivery attempt of the SMS message from a first subscriber to a second subscriber via said SMSC; intercepting transparently said SMS message delivery attempt from the first subscriber in the network before delivery of said SMS message; routing said intercepted SMS message delivery attempt via a smart services control node in the network; examining said message delivery attempt for possible invocation of a smart service to said SMS message; and invoking said smart services for said SMS message destined to said subscriber in response to said examination. The invention can be implemented in a single network or between two or more networks.

24 Claims, 6 Drawing Sheets

U.S. PATENT DOCUMENTS

| | | |
|---|---|---|
| 5,915,222 A | 6/1999 | Olsson et al. |
| 7,003,307 B1 * | 2/2006 | Kupsh et al. ............... 455/466 |
| 7,395,077 B2 * | 7/2008 | Wilson et al. ............... 455/466 |
| 2002/0077133 A1 * | 6/2002 | Mizell et al. ............... 455/466 |
| 2003/0091020 A1 | 5/2003 | Bantukul et al. |
| 2004/0180678 A1 * | 9/2004 | Smith et al. ............... 455/466 |
| 2004/0181550 A1 * | 9/2004 | Warsta et al. ............ 707/104.1 |
| 2004/0244102 A1 * | 12/2004 | Benzon et al. ............... 4/420 |
| 2006/0148495 A1 * | 7/2006 | Wilson ............... 455/466 |

FOREIGN PATENT DOCUMENTS

| | | |
|---|---|---|
| WO | 0122752 A1 | 3/2001 |
| WO | 02091764 A1 | 11/2002 |
| WO | 03049461 A2 | 6/2003 |

\* cited by examiner

MESSAGING SYSTEM AND METHOD

FIELD OF THE INVENTION

The present invention relates to a system and method of managing SMS messages between a subscriber of a first mobile operator network and another subscriber either located in the first network or associated with a second mobile operator network in a telecommunications system. In particular the invention provides a system and method for introducing value added services, sometimes called smart services, to standard SMS messages.

BACKGROUND TO THE INVENTION

Short messaging Service (SMS) are being used increasingly particularly by mobile telephone users. One of their principal uses to date is for sending text messages from one mobile telephone user to another, for example, confirming an appointment, or just simply sending a greeting. Short Message Service (SMS) is rapidly becoming the messaging medium of choice for larger and larger segments of the public. It enables the sending of short text messages to wireless phones, and in this way it enables mobile phone users the benefits of limited functions from the worlds of paging, email and instant messaging. In the simplest form of operation an SMS message is sent from one mobile entity to another mobile entity via a SMS Centre (SMSC).

SMS messages can be transmitted within the same mobile telephone network or to anyone with roaming service capability. They can also be sent to digital phones from a Web site (server) with an internet link or from one digital phone to another. Typical uses of SMS include interpersonal communication and notifying services to mobile phone owners. These notification services include message notifications related to arrival of voicemail, email and fax messages, and reminder services; email inter-working (this refers to allowing SMS message to be converted and sent as e-mail and vice-versa); paging inter-working; and information services such as weather reports, traffic reports, stock quotes, exchange rates etc.

Due to the popularity of SMS messaging new applications are being developed for example picture messaging and multi-media messaging applications, which pose considerable technical challenges to network operators. Additionally smart services or value added services for SMS are been developed like auto 'on vacation' response or copy/divert to E-mail amongst others. A problem with providing these services is that existing SMS Centre (SMSC) architectures are not suitable for implementing these new types of smart services. This has the result that network operators are reluctant to introduce these smart services as they affect the core SMSC architecture.

Another problem with the development of smart services for SMS messaging is that it is very difficult for mobile network operators (MNOs) to offer smart services for a SMS message, which originates from a subscriber belonging to other mobile network operator (MNO) and destined to his subscriber. For example Subscriber R belongs to MNO A. Subscriber S belongs to MNO B. MNO A wishes to offer Smart Services to his subscribers (one of them being R). When subscriber R receives a message originated from Subscriber S, the short message is delivered directly by the SMSC in the MNO B's network to Subscriber R. The SMSC in the MNO A's network has no knowledge of this messages. For this reason, MNO A cannot offer SMS based Smart Services implemented in a SMSC.

In addition mobile network operators seek to introduce these supplementary services to the person-to-person SMS services within their own network (i.e where the sender also belongs to the mobile network operator A), but are unable to do this in a manner which is transparent to the home SMSC (i.e. it does not involve a core SMSC architecture modification) and is technically difficult to achieve.

European Publication No. EP1255414 'Comverse' discloses a system and method for enabling improved management of SMS messages, and in particular automatic replies, forwarding, filtering, saving and deleting of SMS messages on a wireless handset or alternative SMS enabled device. An SMS Center is used for managing SMS messages, an Auto-Reply Message Server (ARMS) stores Auto-Reply Messages and allows a message receiver to set up, change, or delete Auto-Reply Messages, and an SMS Automatic Handling Server (SAHS) handles message instructions for a message receiver. The ARMS and SAHS may be separate components, a unified component, and may be operational such that only one of them may be included in the system. However a problem with this type of system is that it does not allow for smart services associated with SMS termination to be implemented for SMS messages originating from a subscriber in one network to be delivered to a subscriber in another network, as the Comverse application requires special SMSC handling to check if an ARM is configured. The 'Comverse' system also involves a new query interface to the SMSC and therefore offering these types of services cannot be done in a manner transparent to the SMSC.

A further problem with offering Smart Services for SMS messages is how to handle retries of the SMS message originated in other network operators when the message fails to reach its intended recipient. This case arises where the original attempt fails, for example the recipient may be out of coverage and the remote SMSC will retry the message. The complication arises from the fact that there is nothing in the SMS message that indicates that it is a retry (e.g. a unique message ID which is repeated in the retry message). Unless detecting retries a node implementing SMS smart services (referred to as a SMS smart services control node) will see this message as a distinct and different message and will thus re-apply the same smart service to the same message. This may be highly undesirable from a service perspective. The problem is further exacerbated if the smart service control node were to implement specialised billing for a particular services and would result in a double charge.

Another problem with mobile device users is the receipt of unsolicited SPAM SMS messages. An increasing way for companies to target potential consumers is to send unsolicited text messages to users for services they do not require.

OBJECT OF THE INVENTION

It is therefore an object of the invention to provide an improved system and method for managing SMS messages and to provide additional smart services to a SMS message in a telecommunications system.

Another object of the invention is to provide a system and a method of managing SMS messages between a subscriber of a first mobile operator network and another subscriber of a second mobile operator network in a telecommunications system.

Another object of the invention is to provide a system and method for managing person-to-person SMS messages to provided smart services in a manner that is transparent to the SMSC.

SUMMARY OF THE INVENTION

According to the present invention there is provided, as set out in the appended claims, a system and method of managing SMS messages in a first mobile operator network, said network comprising a plurality of subscribers and a Short Message Service Centre (SMSC), the method comprising the steps of:
- starting a delivery attempt of the SMS message from a first subscriber to a second subscriber via said SMSC;
- intercepting transparently to the SMSC said SMS message delivery attempt from the first subscriber in the network before delivery of said SMS message;
- routing said intercepted SMS message delivery attempt via a smart services control node in the network;
- examining said message delivery attempt for possible invocation of a smart service to said SMS message; and
- invoking said smart services for said SMS message destined to said subscriber in response to said examination.

According to another aspect of the present invention there is provided a system and method of managing SMS messages between a subscriber of a first mobile operator network and another subscriber of a second mobile operator network in a telecommunications system the method comprising the steps of:
- delivering a SMS message from said subscriber in said first mobile operator network to said subscriber of said second mobile operator network;
- intercepting a SMS message inbound delivery attempt in said second mobile operator network before delivery of said SMS message;
- routing said intercepted SMS message delivery attempt via a smart services control node in second operator mobile network;
- examining said message delivery attempt for possible invocation of a smart service to said SMS message; and
- invoking said smart services for said SMS message destined to said subscriber of said second mobile operator network in response to said examination.

Preferably, the step of intercepting, which is done transparently, includes intercepting an inbound HLR query associated with said message delivery attempt. One of the advantages of the present invention is that the interception of the delivery attempt allows the SMS message to be routed through a Smart Services Control Node (SSCN), where the Smart Service logic is invoked. This solution provides a simple method and architecture system for implementing Smart Services. The advantage of intercepting the inbound HLR signal is that there are no changes required in remote networks and no fundamental changes required in operating the recipient network. Additionally, there is no technical need for the message originator to put in a special indicator for the smart service, for example a special address or no new signals are needed to indicate that a smart service is required.

As the HLR Query forms part of the standard mechanism for an SMSC to deliver an SMS messages to a mobile handset, the method of intercepting the HLR query en-route to the HLR is thus transparent to the SMSC and is easily implemented into existing networks. This manner of intercepting SMS message delivery attempts can be additionally used to introduce Smart Services for SMS messages resident in the mobile network operators own SMSC as well as other network operators SMSCs.

Preferably, the step is carried out of examining the intercepted HLR query to determine that a Smart Service needs to be applied to said SMS message. The method is to route the SMS message to the Smart Services Control Node. In one embodiment this is accomplished by replacing in the HLR query response the MSC/SGSN network location address of the second recipient device with the network location address of the Smart Services SMS control node. The Smart Services Control Node acts as a pseudo mobile station controller (MSC) for the SMS message. The MSC/SGSN network location address is a parameter of the HLR query response In one embodiment the invention carries out the step of intercepting said HLR query s based on a condition that said query originated from another network. Additionally the step of carrying out smart services on said SMS message when said condition determines whether a smart service needs to applied to said SMS message is performed. The criteria for intercepting the inbound SMS delivery attempt is based on the condition that the SMS delivery attempt originated from another network. In another embodiment, the criteria for interception is based on a condition that the SMS Delivery attempt is originating from the home SMSC. The intercepted SMS delivery attempt is examined by the Smart Services Control Node (SSCN). The result of the examination is a determination of whether a smart service needs to be applied to the message. In the case that a smart service needs to be applied, the routing label for MSC network location address of the recipient is modified in the HLR query response to be the network location address of the SSCN. Ideally the indication from the HLR Query is associated with one or more of the following: a. SMS service, a specific subscriber directory number (MSISDN), a directory number in the HLR Query matches a specific number prefix, a specific SMSC identified by its PLMN network address, a foreign SMSC network address.

Suitably, in some scenarios the invention carries out the step of delivering said SMS message from said Smart Services Control Node to the second device. This is accomplished by routing the message via the original MSC/SGSN network location address that was stored in said Smart Services Control Node obtained from said intercepted SMS delivery attempt.

Suitably, in other scenarios the invention carries out the step of terminating said SMS message delivery when the Smart Service Logic requires that said SMS message is not to be delivered to the subscriber in the second network, for example the Smart Service is to filter out SPAM SMS messages originating from SMS centres belonging to other networks.

Ideally, in another embodiment, the step of terminating the SMS message delivery attempt in the said smart services control node is carried out when the said smart service requires that the said SMS message is not delivered to said subscriber of the said second operator network.

Preferably, a unique identifier for said SMS message is generated at said smart services SMS control node wherein said unique identifier is generated from one or more of the following SMS message elements: Originating Address, Destination Address, Fragment number, SMS Centre timestamp or SMSC address. Ideally the unique identifier is stored in a storage memory of said SMS services SMS control node.

Ideally, the invention carries out the step of comparing the stored unique identifier with unique identifiers of each SMS message delivery attempt processed by said smart services SMS node for detecting subsequent retry SMS delivery attempts of any original undelivered SMS messages.

In another embodiment only unique identifiers are stored in said storage memory for retry SMS delivery attempts for comparison and wherein said retry SMS delivery attempt is routed onwards by the smart services control node to the real network location address of the said subscriber after said comparison. The onward routing imay be conditionally based on a service indicator associated with the smart services control node.

Preferably, the steps are carried out of generating a database of unique identifiers in said storage memory and deleting said stored unique identifiers after a preset period of time.

There is also provided a computer program comprising program instructions for causing a computer program to carry out the above method which may be embodied on a record medium, carrier signal or read-only memory.

BRIEF DESCRIPTION OF THE DRAWINGS

The features and advantages of the invention will be presented in conjunction with the following illustrations listed below in which.

DETAILED DESCRIPTION OF THE DRAWINGS

Figure 1:
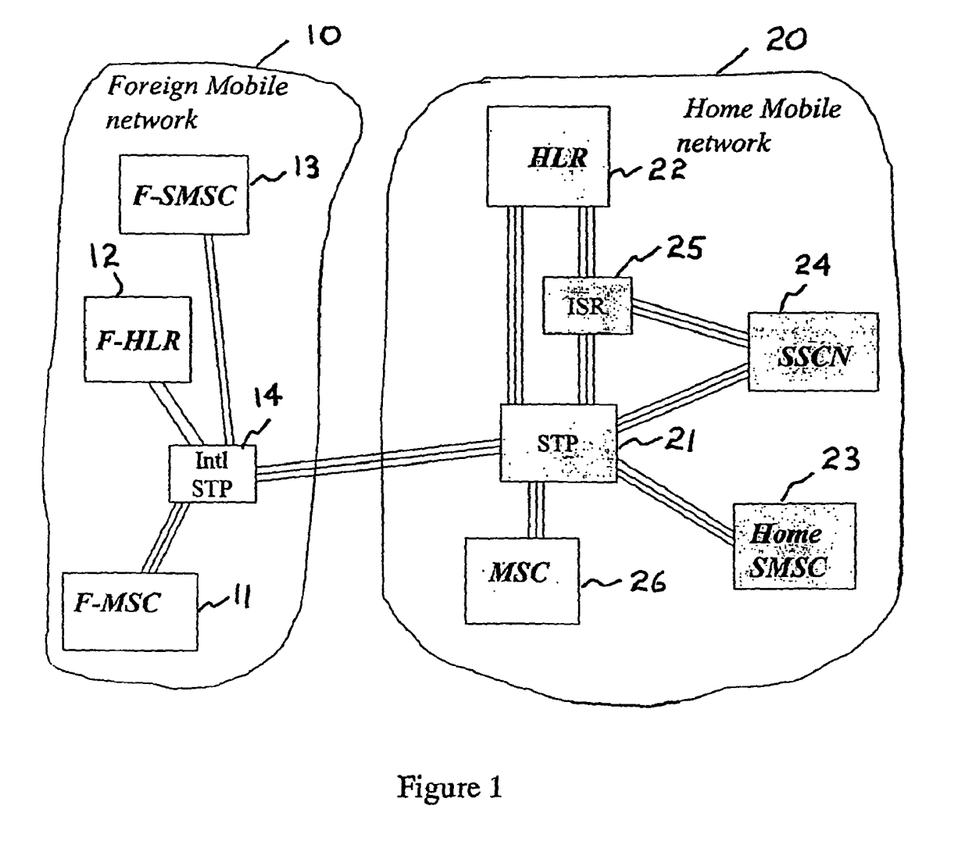
FIG. 1 is a network diagram overview of one embodiment of the present invention illustrating a first and second operator network.

Referring to FIG. 1 there is illustrated a first embodiment of the present invention comprising a first operator network or other mobile network operator indicated generally by the reference numeral (10) and a second operator network illustrated by the reference numeral (20). The first operator network (10) comprises a mobile station controller (MSC) (11), a home location register (HLR) (12) and an associated SMS centre (13) all of which are connected to a signalling routing node (14), each component of the first operator network is known in the art. The two networks are connected via a signalling network (normally SS7 standard), which primarily consist of signalling routing nodes, also known as Signalling Transfer Points (STPs). In the first operator network, there is shown a signalling routing node (14) and in the second operator network, there is also shown a signalling routing node (21). The second operator network (20) also comprises a home location register (HLR) (22), a SMS centre (23), a mobile switching centre (26), all connected to the signalling routing node (21). The second operator network (20) comprises a smart services SMS control node (24) and an intelligent signalling routing node (25). The intelligent signalling routing node (25) is connected to the signalling network at the signalling routing node (21). The signalling routing node (25) is capable of routing messages to the Smart Services control node (24) and the home location register (HLR) (22).

In operation, a user with a device wishing to send an SMS message from the first operator network (10), the device being for example a mobile telephone, wishes to send an SMS message from the first device in the first operator network (10) or roaming in another operator network to a second device in the second operator network (20). The SMS message delivery is managed by the short message service centre (13) associated with the sender. The Short Message Service Centre (13) initiates a message delivery attempt by sending a location query to the HLR (22) associated with the second device. This home location register (HLR) query is a signalling message and is therefore transmitted over the signalling network to the second operator network (20) via the signalling routing nodes (21) and (25). In the Second Operator's network, the intelligent signalling routing node (25) intercepts the inbound delivery attempt and routes it to the Smart Services Control Node (SSCN) (24). The SSCN (24) examines the inbound delivery attempt to determine whether Smart Services need to be invoked or applied to the SMS message from the examination.

If a Smart Service message is required for the message, the SSCN modifies the location parameter of the inbound delivery attempt, for example modifying the HLR query response, which is returned to the SMSC (13) in the first operator's network. The modified value is such that the SMSC (13) in the first operators network delivers the actual message to the SSCN (24). In this regard the SSCN (24) is acting as the serving MSC towards the SMSC (13) in the first operators network (10).

The Smart Services associated with the SMS message is executed by the Smart Services SMS control node (24). Alternatively, the Smart Service Control Node (24) can request an external system, for example Lawful intercept server, to execute the Smart Service. Examples of Smart Services, but not limited to thereto, are auto 'on vacation' response, copy/divert to e-mail, malicious content filter, legal interception of SMS messages for law enforcement, copy to messages to an alternate destination, divert messages if it is not reachable, information for outbound roamers, group messaging or personalised short codes. Once a Smart Service is considered to be applicable to the message, the SMS Delivery Attempt is re-routed via the Smart Service Control Node for Smart Service handling. The Smart Service Control node either executes the Smart Service logic (e.g. "copy to email") on the SSCN locally or requests a separate system to execute the Smart Service logic. Depending on the Smart Service logic response, the message deliver attempt may (i) proceed onwards to the recipient device, e.g. copy to Inbox smart service or (ii) terminate the message successfully, e.g. divert to Inbox smart service or (iii) terminate unsuccessfully, e.g. SMS barring smart service or (iv) terminate unsuccessfully with a temporary problem, e.g. Prepaid charging smart service where message recipient does not have enough balance. All of these actions are standard procedures that can be invoked by the network when handling the delivery of an SMS message to a recipient device.

The entire process is transparent to the SMSC (13), that is no changes need to be made to the SMSC (13) or no new special interfaces need to be configured or implemented at the SMSC (13). As far as the SMSC (13) is concerned the message delivery is being attempted towards the subscriber using the standardised procedures (e.g. GSM Mobile Application Part/GSM 03.40 SMS)—the SMSC (13) is not aware that any smart service logic processing is being executed.

The deployment of the signalling routing node (25), sometimes called an intelligent signalling router, can intercept the inbound delivery attempt or the HLR queries for SMS traffic. The present invention provides a special routing expression configured in the signalling routing node (25) to relay the HLR query to the Smart Services SMS control node (24). As an example: if the signalling routing node (25) determines that the HLR query signalling message is originating from another network. The Smart Services SMS control node (24) examines the query and determines if a Smart Service is applicable to the associated SMS message. This could be based for example on the recipient telephone number (MSISDN) which can be ascertained from the examination of the intercepted HLR query. If the Smart Services SMS control node (24) determines that a Smart Service needs to be applied, the node (24) modifies a parameter in the HLR query response such that the SSCN (24) acts as the serving MSC (or SGSN in GSM networks) for the actual short message and ensuring that the SMSC (13) routes the message to the smart services SMS control node (24). The method and system of the present invention provides that the modification replaces the messaging service centre location address of the recipient's device with the network address of the Smart Services control node (24). Thus the Smart Services control node (24) acts as a pseudo mobile switching centre (MSC). This method is transparent to the SMSC (13), as the smart services control node network address is just considered as another network MSC address by the SMSC (13). The Smart Services (SMS) control node (24) stores in a memory space of the node (24) the "real" MSC address for later use. This ensures that the SMS messages are delivered via the Smart Services control node (24), which then processes the SMS message for Smart Services. If the Smart Service application requires that the SMS message is still delivered to the recipient, the SMS control node (24) delivers the SMS message to the MSC (26) address that were cached from the original HLR query. In this way the invention provides a simple mechanism for delivering Smart Services associated with the SMS message.

Figure 2:
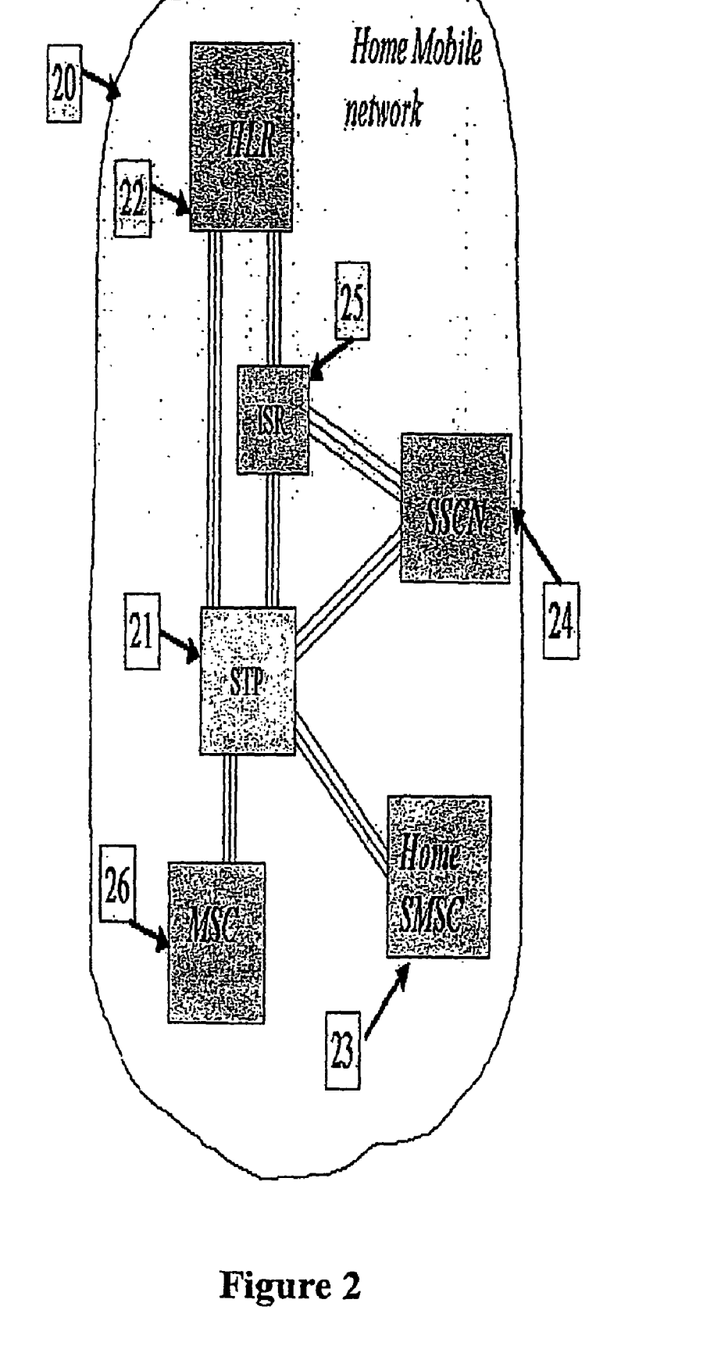
FIG. 2 is a network diagram overview of another embodiment of the present invention for a single operator network comprising a plurality of subscribers.

Referring to FIG. 2 there is illustrated a second aspect to the present invention comprising a single mobile network indicated generally by the reference numeral (20). The single mobile network (20) comprises a plurality of subscribers (not shown) associated with the single operator network (20) and comprises the same elements as the second mobile network of FIG. 1. The same reference numerals have been used for each element of the single network for the sake of clarity, the operation of which will now be described.

In operation, SMS messages originated by subscribers or users of the single mobile network operator are deposited during message origination into the Short Message Service Centre (23). The subsequent SMS message delivery is managed by the short message service centre (23). The Short Message Service Centre (23) initiates a message delivery attempt by sending a location query to the HLR (22) associated with the recipient device. This home location register (HLR) query is a signalling message and is therefore transmitted over the signalling network to the HLR (22) via the signalling routing nodes (21) and (25). In the signalling network, the intelligent signalling routing node (25) intercepts the HLR query associated with the delivery attempt and routes it to the Smart Services Control Node (SSCN) (24). The SSCN (24) examines the delivery attempt to determine whether Smart Services need to be invoked or applied to the SMS message from the examination.

If a Smart Service is to be applied to the message, the SSCN modifies the location parameter of the delivery attempt, for example modifying the HLR query response, which is returned to the SMSC (23) in the mobile network. The modified value is such that the SMSC (23) delivers the actual message to the SSCN (24). In this regard the SSCN (24) is acting as the serving MSC towards the SMSC (23) in the mobile network (20). This method is transparent to the SMSC (23), as the smart services control node network address is just considered as another network MSC address by the SMSC (23).

The Smart Services associated with the SMS message is executed by the Smart Services SMS control node (24). Alternatively, the Smart Service Control Node (24) can request an external system, for example Lawful intercept server, to execute the Smart Service. Examples of Smart Services, but not limited to thereto, are auto 'on vacation' response, copy/divert to e-mail, malicious content filter, legal interception of SMS messages for law enforcement, copy to messages to an alternate destination, divert messages if it is not reachable, information for outbound roamers, group messaging or personalised short codes. Once a Smart Service is considered to be applicable to the message, the SMS Delivery Attempt is re-routed via the Smart Service Control Node for Smart Service handling. The Smart Service Control node either executes the Smart Service logic (e.g. "copy to email") on the SSCN locally or requests a separate system to execute the Smart Service logic.

The deployment of the signalling routing node (25), sometimes called an intelligent signalling router, can intercept the delivery attempt or the HLR queries for SMS traffic. The present invention provides a routing expression configured in the signalling routing node (25) to relay the HLR query to the Smart Services SMS control node (24). As an example: if the signalling routing node (25) determines that the HLR query signalling message is destined to another network. The Smart Services SMS control node (24) examines the query and determines if a Smart Service is applicable to the associated SMS message. This could be based for example on the recipient telephone number (MSISDN) which can be ascertained from the examination of the intercepted HLR query. If the Smart Services SMS control node (24) determines that a Smart Service needs to be applied, the node (24) modifies a parameter in the HLR query response such that the SSCN (24) acts as the serving MSC (or SGSN in GSM networks) for the actual short message and transparently ensuring that the SMSC (23) routes the message to the smart services control node (24). The SMSC (23) considers the SSCN (24) as just another serving MSC associated with the recipient device and is not aware that the SSCN (24) is a special type of node. The method and system of the present invention provides that the modification replaces the messaging service centre location address of the recipient's device with the network address of the Smart Services control node (24). Thus the Smart Services control node (24) acts as a pseudo mobile switching centre (MSC). The Smart Services (SMS) control node (24) stores in a memory space of the node (24) the "real" MSC address for later use. This ensures that the SMS messages are delivered via the Smart Services control node (24), which then processes the SMS message for Smart Services. If the Smart Service application requires that the SMS message is still delivered to the recipient, the SMS control node (24) delivers the SMS message to the MSC (26) address that was cached from the original HLR query. In this way the invention provides a simple and transparent mechanism for delivering Smart Services associated with the SMS message.

The entire method of the present invention is transparent to the SMSC (23). The SMSC (23) can be a standard GSM (or another wireless telephony technology known in the art such as CDMA) SMSC. The present invention does not require the SMSC (23) to provide a new interface or to implement new extensions to existing message delivery protocols. Neither does the present invention require the SMSC (23) to configure an application route to send the concerned SMS messages to an application server before actual delivery of the SMS message to the recipient is performed. For the present invention, the SMSC (23) is behaving as if it was directly delivering the SMS message to the message recipient.

Figure 3:
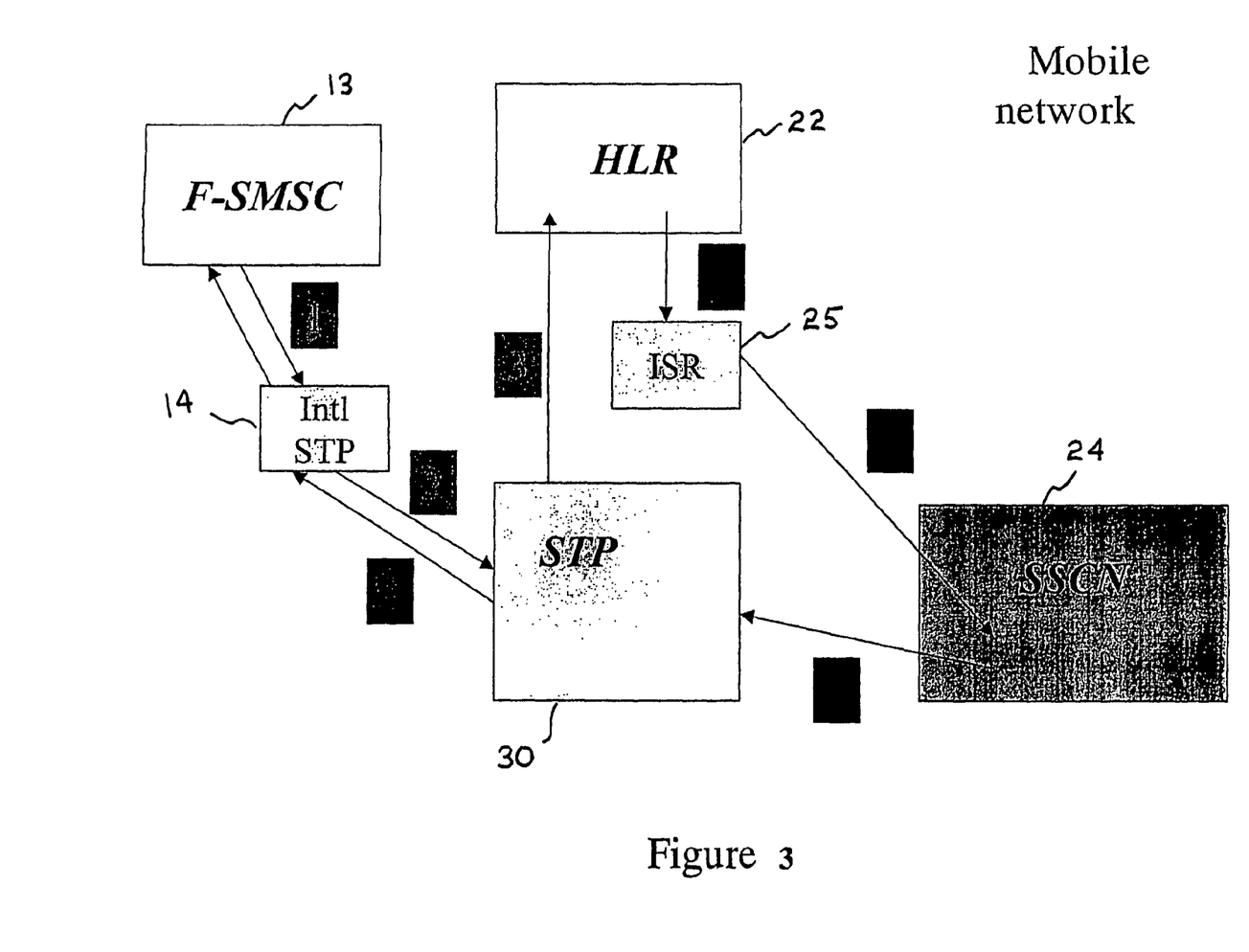
FIG. 3 illustrates an embodiment of the present invention for a HLR Query interception.
Figure 4:
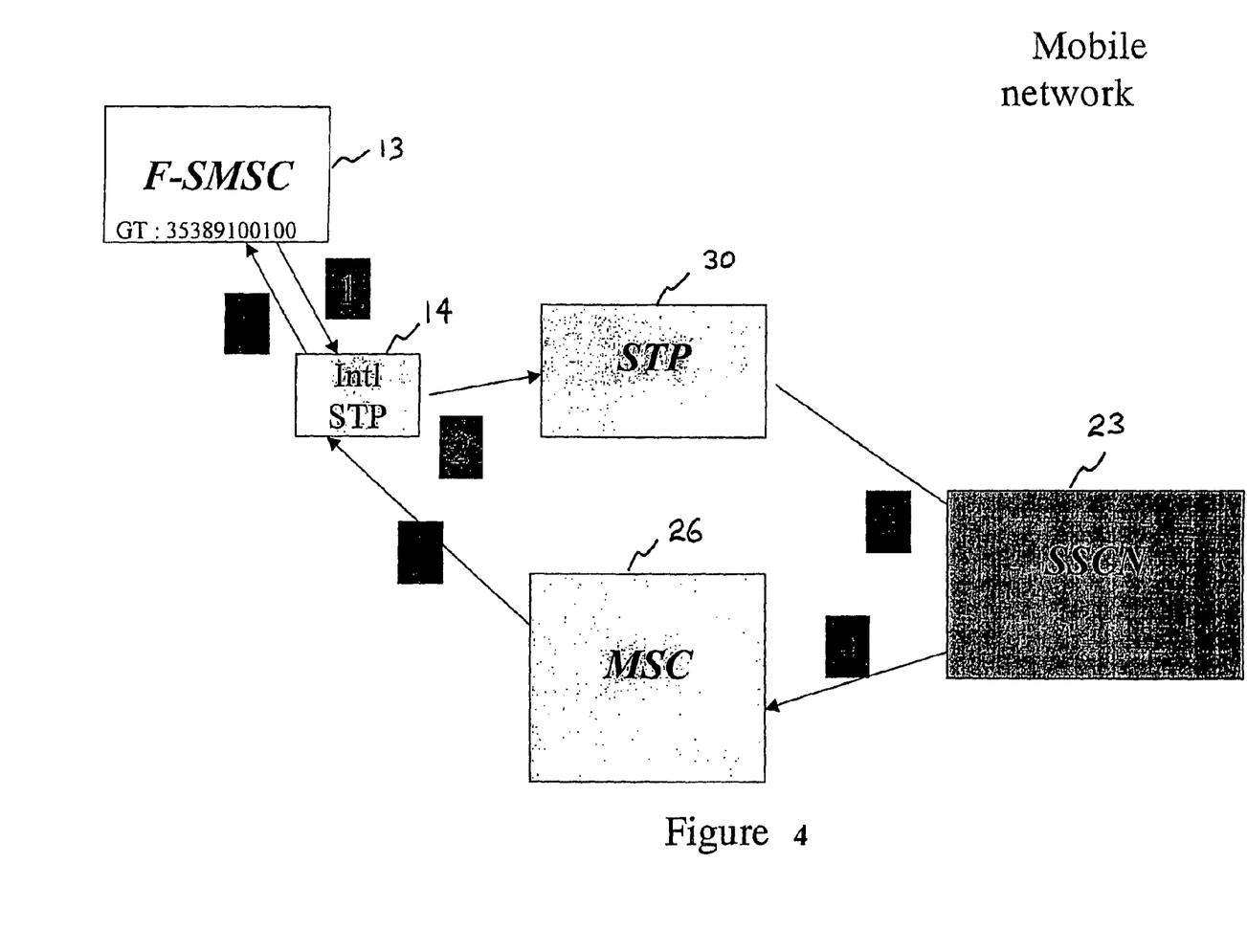
FIG. 4 illustrates an embodiment of the present invention for a SMS message delivery.

Referring to FIG. 3 illustrates another embodiment of the present invention. An STP signalling router (30) routes a HLR query to the HLR (22). In this scenario the intelligent signalling routing node (25) uses a special routing rule to route the HLR query response directly to the smart services control node (24). The smart services control node replaces the location address (usually specified as an MSC address) in the HLR query response with the network location address of the smart services control node address for off network traffic. This ensures that the subsequent message delivery attempt (carried in GSM using the MT-FSM signal) from the SMSC (13) will be sent to the smart services control node (24). FIG. 4 illustrates this SMS delivery attempt (via the MT-FSM signal) for a user in the second network (20) who has subscribed to smart services which is described in more detail in FIG. 6 below.

Another aspect of the invention is that the Smart Services control node (24) implements Smart Services by using signal triggers for the execution of the Smart Service logic. An important aspect is the fact that the trigger is meta data relating to the message and not the actual message itself. The Smart Services control node (24) functions as a relay node switch from an SMS message delivery perspective. This ensures that the delivery receipt and the Call Detail Record (CDR) is not generated in the remote SMS centre (13).

Figure 5:
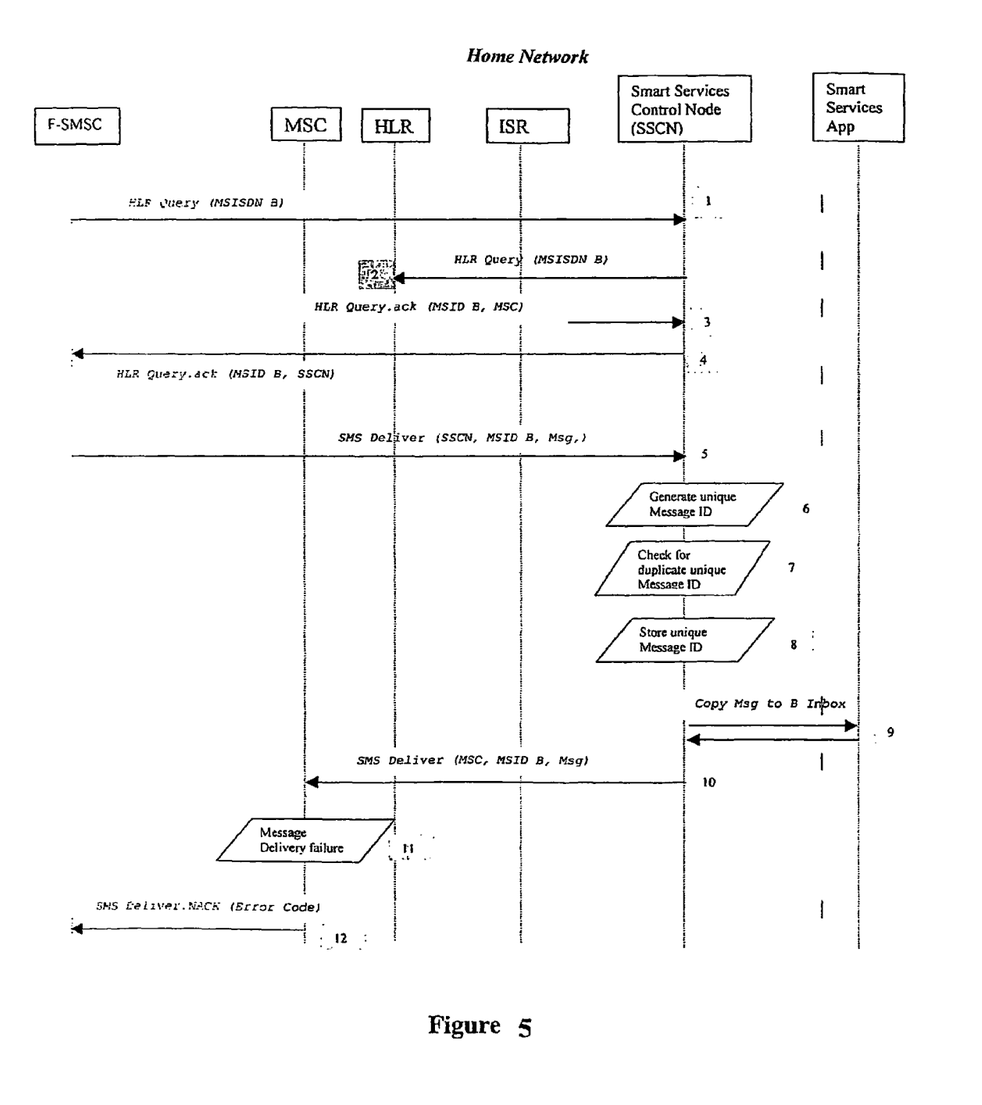
FIG. 5 is a flow diagram for handling SMS messages on a first attempt according to one aspect of the present invention shown in FIG. 3.
Figure 6:
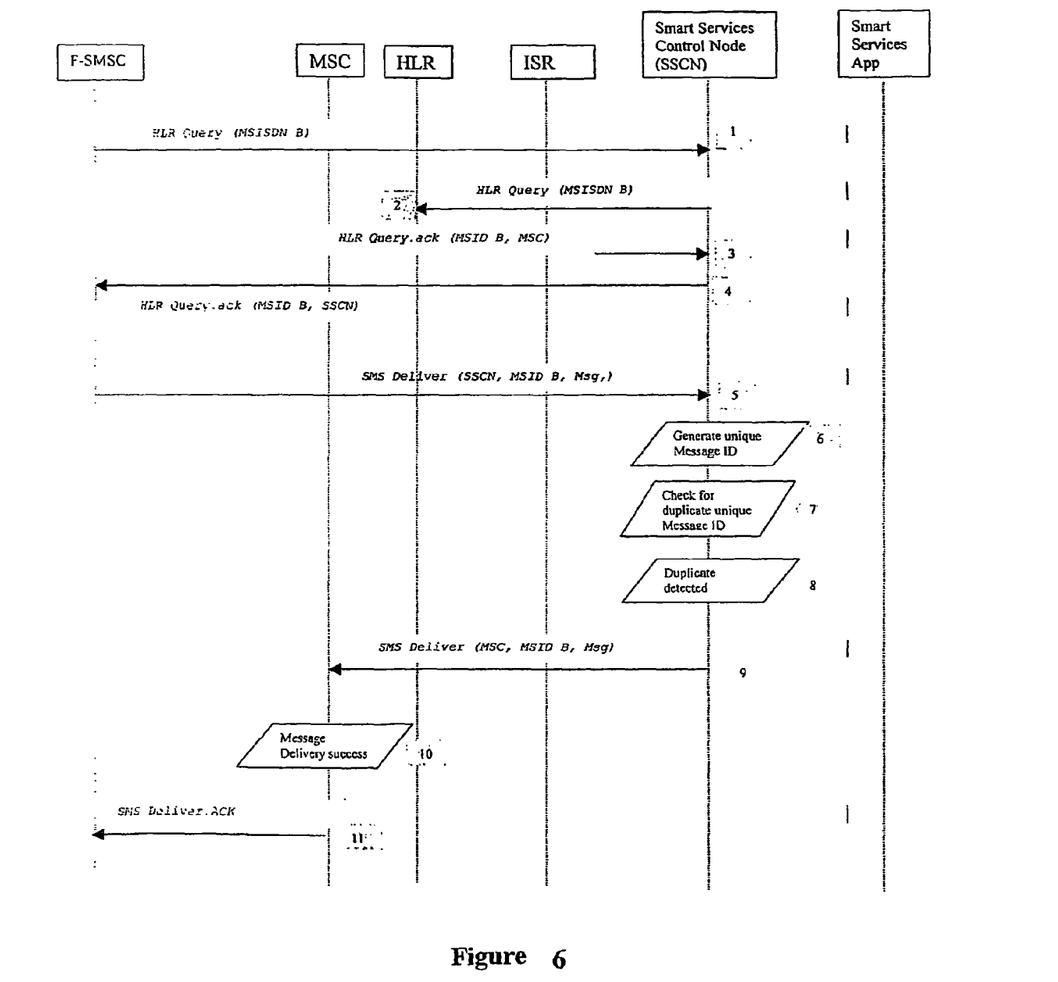
FIG. 6 is a flow diagram for handling SMS messages on a retry second attempt according to another aspect of the present invention shown in FIG. 4.

Referring now to FIGS. 5 and 6 illustrates a flow diagram of how to manage an SMS message that is deemed to require Smart Service processing, however the SMS message has multiple delivery attempts due to temporary errors (e.g. paging problem in the network (20)). Smart Service Logic is such that it is applied to the message rather than each message delivery attempt. The invention in the Smart Services SMS control node (24) generates a unique message ID for each SMS message delivery attempt that is processed for a Smart Service. The generated unique identifier is generated from at least all of the following features: originating address, destination address, fragment number, SMS centre time-stamp, or any other parameter to define a unique identifier. The algorithm for the generating the unique identifier is guaranteed to be the same for each delivery attempt. The unique identifier is stored by the Smart Services SMS control node (24) in a storage memory (not shown). For each SMS message delivery attempt that passes via the Smart Services SMS control node (24), the unique identifier is generated and a check is then made to see if a similar or duplicate identifier is in the storage memory. If the identifier value already exists in the memory store, then this message is determined to be a retry message delivery attempt and the SMS control node (24) does not process the SMS message for any repeated Smart Services handling. Consequently Smart Service handling is only done once for SMS messages that require multiple delivery attempts.

Referring to the flow diagram of FIG. 5 in detail illustrates another implementation of carrying out retry handling aspect of the present invention:

1. SMS Message is originated by another network subscriber (identified by MSISDN A) and is thus submitted to his/her SMSC (13) (labelled foreign F-SMSC in FIG. 6). The recipient (B) is a subscriber of the home network (20). The F-SMSC (13) initiates a first delivery attempt by sending an HLR query to the HLR (22) associated with B. The HLR Query is intercepted by the intelligent signalling router (25) and routed to the SSCN (24). The SSCN (24) checks if the recipient B has Smart Services provisioned (in this case "copy to Inbox"). If YES, it notes the message attempt for the recipient B.
2. The HLR Query is onwards routed to the HLR. The HLR (22) looks up the subscriber B (identified by MSISDN B) and returns delivery details (e.g. Mobile Subscriber ID, MSC address) in the Query response.
3. The HLR sends the Query acknowledgement. The signalling network (or the HLR) routes the message via the intelligent signalling router (25). The intelligent signalling router (25) routes the Query response to the Smart Services Control Node (24).
4. The SSCN (24) replaces the network location MSC address with its own network location address. The SSCN (24) then routes the HLR Query response back to the F-SMSC (13).
5. F-SMSC (13) proceeds to deliver the message text by sending an SMS Deliver message to the indicated network location address—in this case the SSCN (24).
6. The SSCN (24) generates a unique message ID for this message using a algorithm that generates an output that is (i) an unique ID for this said message that was originated by subscriber A and sent via the F-SMSC (13) to destination B and (ii) is the same value if the said same message is processed by said unique ID algorithm again.
7. The SSCN (24) checks the message ID store for a duplicate entry to determine if this message has already being processed by the SSCN (24). In this instance no record exists.
8. The unique Message ID is stored.
9. As B is provisioned with for example a "Copy to Inbox" smart service, the message details and content is passed to an external system, which performs the copy. The external system instructs the SSCN (24) to proceed with message delivery processing.
10. The SSCN (24) restores the original MSC address as captured in Step 4. The SSCN routes the message to the MSC.
11. The MSC attempt to deliver the message to B's handset (not shown above). The delivery attempt fails due to an external error (e.g. paging problem).
12. The MSC returns a negative acknowledgement to the F-SMSC.

Referring now to the flow diagram of FIG. 5 which describes how a retry attempt of the said SMS message is handled:

1. SMS Message is originated by another network subscriber (identified by MSISDN A) and is thus submitted to his/her SMSC (13) (labelled foreign F-SMSC in FIG. 6). The recipient (B) is a subscriber of the home network (20). The F-SMSC (13) initiates a first delivery attempt by sending an HLR query to the HLR (22) associated with B. The HLR Query is intercepted by the intelligent signalling router (25) and routed to the SSCN (24). The SSCN (24) checks if the recipient B has Smart Services provisioned (in this case the example is "copy to Inbox"). IfYES, it notes the message attempt for the recipient B.
2. The HLR Query is onwards routed to the HLR. The HLR (22) looks up the subscriber B (identified by MSISDN B) and returns delivery details (e.g. Mobile Subscriber ID, MSC address) in the Query response.
3. The HLR sends the Query acknowledgement. The signalling network (or the HLR) routes the message via the intelligent signalling router (25). The intelligent signalling router (25) routes the Query response to the Smart Services Control Node (24).
4. The SSCN (24) replaces the network location MSC address with its own network location address. The SSCN (24) then routes the HLR Query response back to the F-SMSC (13).

5. F-SMSC (13) proceeds to deliver the message text by sending an SMS Deliver message to the indicated network location address—in this case the SSCN (24).
6. The SSCN (24) generates a unique message ID for this message using the same algorithm.
7. The SSCN (24) checks the message ID store for a duplicate entry to determine if this message has already being processed by the SSCN (24).
8. In this instance a duplicate record exists and thus the "Copy to Inbox" service is not initiated.
9. The SSCN (24) restores the original MSC address as captured in Step 4. The SSCN (24) routes the message to the MSC (21).
10. The MSC (21) attempts to deliver the message to B's handset (not shown above). The delivery attempt succeeds.
11. The MSC returns a positive acknowledgement to the F-SMSC (24).

It is important to appreciate that the SMS Smart Services control node (24) can relay control of the message to an external Smart Services Server (not shown) for execution of the smart service logic, for example copy message to recipient's mail Inbox. The term 'Smart Services Server' is a generic term used to describe systems that implement Smart Service logic, for example pre-paid billing gateway, unified messaging system, and SMS SPAM filtering systems which are available in the art. A Smart Services Server can be co-located with SMS Smart Services Control node (24).

Another important aspect of the present invention is the ability of the SSCN (24) to determine whether a message originates from a barred source or barred entity, for example another SMSC from another network. The SSCN (24) stores a list or database of barred address locations in storage memory, of the SSCN (24) and checks each SMS message that is routed through the SSCN (24) against barred address locations. In the event that the SSCN (24) determines that a SMS message originates from a barred source the sending of the SMS is terminated. This SMS source determination is particularly useful to prevent unwanted and/or unsolicited SMS messages from remote network entities been delivered to users in the network.

It will be appreciated that a database or data store of unique identifiers for each SMS message is stored in the SSCN (24) for comparison with other unique identifiers to ensure that a SMS message delivery attempt is not a retry message. The unique identifiers are only stored for a preset period of time in order to make the process for comparison efficient. In a typical embodiment the unique identifiers are only stored for one week.

In this specification, the term device or communication device relates, not alone to mobile telephones, but is also used to encompass land-line telephones, laptop computers, personal digital accessories (PDAs), personal computers, or any other device that is capable of transmitting and/or receiving SMS data. Any such device may include, but is not limited to, PowerMac® or iMac® computers manufactured by the Apple® Corporation of Cupertino, Calif., USA; a Portable Digital Assistant (PDA) such as a Palm m505® manufactured by PalmOne® Inc. of Milpitas, Calif., USA; a Portable Digital Computer (PDC) such as an IPAQ® manufactured by the Hewlett-Packard® Company of Palo Alto, Calif., USA; or even a mobile phone such as a Nokia 9500 manufactured by the Nokia® Group in Finland, all of which are generally configured with processing means, output data display means, memory means, input means and wired or wireless network connectivity.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention is not limited to the embodiments hereinbefore described but may be varied in both construction and detail.

The invention claimed is:

1. A method of managing SMS messages in a first mobile operator network, said network comprising a plurality of subscribers and a Short Message Service Centre (SMSC), the method comprising the steps of:
   starting a delivery attempt of the SMS message from a first subscriber to a second subscriber via said SMSC;
   intercepting transparently to the SMSC said SMS message delivery attempt from the first subscriber in the network before delivery of said SMS message, by intercepting an inbound HLR query associated with said message delivery attempt, by examining said intercepted HLR query for possible invocation of a smart service to said SMS message, including the steps of:
   routing the HLR query onward to a HLR
   generating a response to the HLR query in the HLR, the HLR query response including a mobile network location address of said second subscriber;
   replacing, in a smart services control node, the mobile network location address of said second subscriber in an HLR query response with the network location address of the smart services control node;
   routing said intercepted SMS message delivery attempt via the smart services control node in the network; and
   invoking said smart services for said SMS message destined to said subscriber in response to said examination.

2. A method of managing SMS messages, as claimed in claim 1, between a subscriber of the first mobile operator network and another subscriber of a second mobile operator network in a telecommunications system, the method further comprising the steps of:
   delivering an SMS message from said first subscriber in said first mobile operator network to said subscriber of said second mobile operator network;
   intercepting the SMS message inbound delivery attempt in said second mobile operator network before delivery of said SMS message;
   replacing a mobile network location address of said second subscriber in an HLR query response with the network location address of a smart services control node;

routing said intercepted SMS message delivery attempt via the smart services control node in second operator mobile network;

examining said message delivery attempt for possible invocation of a smart service to said SMS message; and invoking said smart services for said SMS message destined to said subscriber of said second mobile operator network in response to said examination.

3. A method of managing SMS messages as claimed in claim 1 wherein the step of intercepting includes intercepting an inbound HLR query associated with said message delivery attempt.

4. A method of managing SMS messages as claimed in claim 3 wherein the step of intercepting includes intercepting an inbound HLR query associated with said message delivery attempt and examining said intercepted HLR query such that said HLR query provides an indication that a smart service needs to be applied to said SMS message and route the SMS message to the smart services control node.

5. A method of managing SMS messages as claimed in claim 4 wherein said indication from the HLR Query is associated with one or more of the following: a SMS service, a specific subscriber directory number (MSISDN), a directory number in the HLR Query matches a specific number prefix, a specific SMSC identified by its PLMN network address, a foreign SMSC network address.

6. A method of managing SMS messages as claimed in claim 4, further comprising the step of replacing a mobile network location address of said second subscriber with the network location address of the smart services control node such that the first mobile network operator routes said SMS message via said smart services control node.

7. A method of managing SMS messages as claimed in claim 1 wherein the step of intercepting said message delivery attempt is based on a condition that said query originated from said SMSC or another mobile network.

8. A method of managing SMS messages as claimed in claim 4, further comprising the step of routing said SMS message from said smart services control node to said real location address wherein said SMS message is routed to said real network location address from an address stored in said smart services control node previously obtained from said HLR query response.

9. A method of managing SMS messages as claimed in claim 1, further comprising the step of terminating said SMS message delivery attempt in the said smart services control node when the said smart service requires that the said SMS message is not delivered to the said subscriber of the said second operator network.

10. A method of managing SMS messages as claimed in claim 1 further comprising the step of terminating said SMS message delivery attempt when said condition of said intercepted delivery attempt indicates in said second operator network that said SMS message originates from a barred originating entity belonging to another network.

11. A method of managing SMS messages as claimed in claim 1, further comprising the step of triggering the execution of smart service logic associated with said smart services SMS control node in response to condition based on the content of said SMS message.

12. A method of managing SMS messages as claimed in claim 1, further comprising the step of triggering the execution of smart service logic associated with said smart services SMS control node in response to condition based on the content of said SMS message and wherein said trigger condition is a meta tag signal or attribute associated with said SMS message.

13. A method of managing SMS messages as claimed in claim 1, further comprising the step of generating a unique identifier for said SMS message at said smart services SMS control node.

14. A method of managing SMS messages as claimed in claim 1, further comprising the step of generating a unique identifier for said SMS message at said smart services SMS control node, wherein said unique identifier is generated from one or more of the following SMS message parameters: Originating Address, Destination Address, message fragment number, SMSC address or SMS Centre timestamp.

15. A method of managing SMS messages as claimed in claim 1, further comprising the step of generating a unique identifier for said SMS message at said smart services SMS control node; storing said unique identifier in a storage memory of said smart services control node.

16. A method of managing SMS messages as claimed in claim 13, further comprising the step of comparing the generated unique identifier with unique identifiers for each SMS message delivery attempt processed by said smart services SMS node for detecting a subsequent attempt of an SMS message from a remote SMSC after the first delivery attempt.

17. A method of managing SMS messages as claimed in claim 13, further comprising the step of comparing the generated unique identifier with unique identifiers for each SMS message delivery attempt processed by said smart services SMS node for detecting a subsequent attempt of an SMS message from a remote SMSC after the first delivery attempt, wherein only unique identifiers are stored in said storage memory for retry SMS delivery attempts for comparison and wherein said retry SMS delivery attempt is routed onwards by the smart services control node to the real network location address of the said subscriber after said comparison.

18. A method of managing SMS messages as claimed in claim 13, further comprising the step of comparing the generated unique identifier with unique identifiers for each SMS message delivery attempt processed by said smart services SMS node for detecting a subsequent attempt of an SMS message from a remote SMSC after the first delivery attempt, wherein only unique identifiers are stored in said storage memory for retry SMS delivery attempts for comparison and wherein said retry SMS delivery attempt is routed onwards by the smart services control node to the real network location address of the said subscriber after said comparison and said onward routing is conditionally based on a service indicator associated with the smart services control node.

19. A method of managing SMS messages as claimed in claim 13, further comprising the steps of generating a database of unique identifiers in said storage memory and deleting said stored unique identifiers after a preset period of time.

20. A computer program on a computer readable storage medium comprising program instructions for causing a computer to perform the method of claim 1.

21. A method of managing SMS messages, between a subscriber of the first mobile operator network and another subscriber of a second mobile operator network in a telecommunications system, the method comprising the steps of:

delivering an SMS message from said first subscriber in said first mobile operator network to said subscriber of said second mobile operator network;

intercepting the SMS message inbound delivery attempt in said second mobile operator network before delivery of said SMS message;

replacing, in a smart services control node, a mobile network location address of said second subscriber in an HLR query response with the network location address of the smart services control node;

routing said intercepted SMS message delivery attempt via the smart services control node in second operator mobile network;

examining said message delivery attempt for possible invocation of a smart service to said SMS message; and invoking said smart services for said SMS message destined to said subscriber of said second mobile operator network in response to said examination.

22. A computer program on a computer readable storage medium comprising program instructions for causing a computer to perform the method of claim 21.

23. A system of managing SMS messages in a first mobile operator network, said network comprising a plurality of subscribers and a Short Message Service Centre (SMSC), the system comprising:

means for starting a delivery attempt of the SMS message from a first subscriber to a second subscriber via said SMSC;

means for intercepting transparently said SMS message delivery attempt from the first subscriber in the network before delivery of said SMS message, by intercepting an inbound HLR query associated with said message delivery attempt by examining said intercepted HLR query for possible invocation of a smart service to said SMS message, including the steps of;

means for routing said intercepted SMS message delivery attempt via a smart services control node in the network;

means for routing the HLR query onward to an HLR;

means in the HLR for generating a response to the HLR query, the HLR query response including a mobile network location address of said second subscriber;

means in a smart services control node for replacing the mobile network location address of said second subscriber in an HLR query response with the network location address of the smart services control node;

means for examining said message delivery attempt for possible invocation of the smart service to said SMS message; and means for invoking said smart services for said SMS message destined to said subscriber in response to said examination.

24. A system of managing SMS messages, as claimed in claim 23, between a subscriber of the first mobile operator network and another subscriber of a second mobile operator network in a telecommunications system, the system further comprising:

means for delivering an SMS message from said subscriber in said first mobile operator network to said subscriber of said second mobile operator network;

means for intercepting the SMS message inbound delivery attempt in said second mobile operator network before delivery of said SMS message;

means for routing said intercepted SMS message delivery attempt via a smart services control node in second operator mobile network;

means for examining said message delivery attempt for possible invocation of a smart service to said SMS message; and means for invoking said smart services for said SMS message destined to said subscriber of said second mobile operator network from said examination.

* * * * *